Dec. 11, 1962 W. O. KAUSCH 3,067,431
ARTIFICIAL BREAST FORM

Filed June 1, 1961 2 Sheets-Sheet 1

INVENTOR.
WALTER O. KAUSCH.
BY
*Robert A. Sloman*
ATTORNEY

Dec. 11, 1962 W. O. KAUSCH 3,067,431
ARTIFICIAL BREAST FORM
Filed June 1, 1961 2 Sheets-Sheet 2
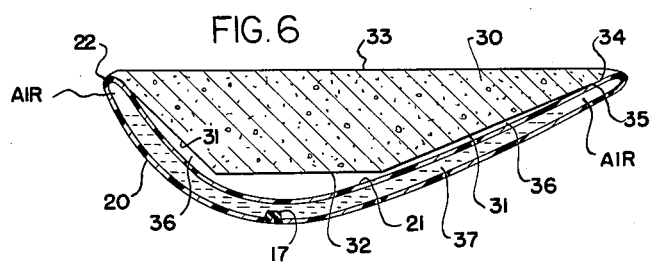
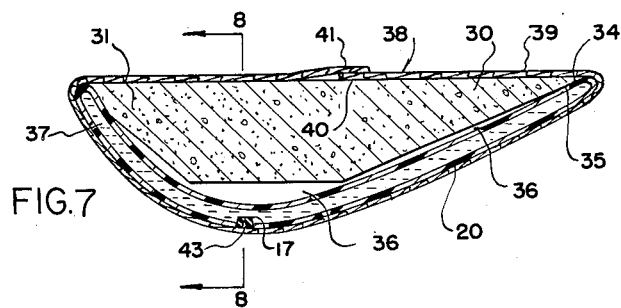
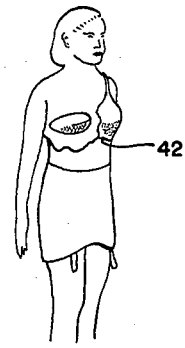
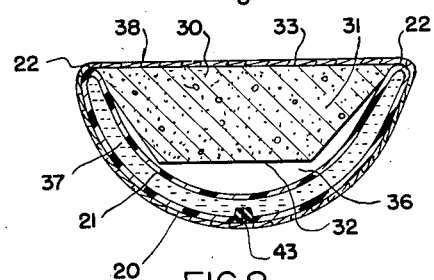
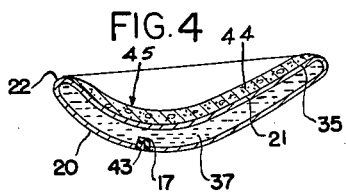
INVENTOR.
WALTER O. KAUSCH.
BY
*Robert A. Sloman.*
ATTORNEY United States Patent Office 3,067,431
Patented Dec. 11, 1962

3,067,431
ARTIFICIAL BREAST FORM
Walter O. Kausch, 13975 Archdale Ave.,
Detroit 27, Mich.
Filed June 1, 1961, Ser. No. 114,100
8 Claims. (Cl. 3—36)

This invention relates to a mastectomy prosthesis or to a device for augmenting the natural form, and is an improvement over my prior United States Patent 2,543,499, dated February 27, 1951, relating to an artificial breast.

It is an object of the present invention to provide an improved mastectomy prosthesis, or similar device, which is primarily directed to simulate in form and feeling the human form, and which as a part of said invention contains a controlled liquid sealed therein for approaching as close as possible to the fluidity in motion of the human form.

Heretofore, many efforts have been extended in this direction, and many products of this type have been placed upon the market employing various forms of padding, including inflatable devices, most of which while they serve the function of padding, do not come up to the standards of a life-like feel and appearance.

It is an important object of the present invention to provide an improved mastectomy prosthesis or related device for augmenting the human form which comes very close to simulating the natural form in appearance and sensitivity to motion, and which overcomes the artificial appearance achieved in many of the padded devices already on the market.

The present invention, though it may be employed generally speaking, to augment merely the natural form, is particularly adapted for the replacement of a partially or fully removed breast to give to the person or return to such person, a natural appearance and a highly beneficial psychological effect believed necessary in cases of this type.

It is a further object of the present invention to provide in the mastectomy prosthesis, or other form delineating device of the present invention, and in conjunction with a fluid impervious flexible envelope, mountable over the human form, a suitable resilient yielding backing material to stabilize the device and to provide an effective means for locating the same and mounting the same upon the human form and to give definition where required in building up the human form and in cooperation with the fluid impervious container with the fluid therein.

It is a further object of the present invention to provide a novel method of manufacture of the present article by which there is achieved a substantial advance in the art in devices of this type.

These and other objects will be seen from the following specification and claims in conjunction with the appended drawings in which:

FIG. 4 shows one form of backing member.

FIG. 6 is a longitudinal section of the present device with the foam backing mounted thereto and secured thereto and illustrative of an initial step in the introduction of fluid into the fluid impervious bag or container.

FIG. 7 is a similar view of the completed article and wherein as a further step in the manufacturing process, the air upon the interior of the impervious container has been removed so the container is completely filled by the fluid therein.

FIG. 8 is a transverse section taken on line 8—8 of FIG. 7.

FIG. 9 is a fragmentary prospective view illustrating the method of mounting the present device upon an individual.

It will be understood that the above drawings illustrate merely one form of apparatus and form of the present invention, it being contemplated that other apparatus and other embodiments of the invention may be provided within the scope of the claims hereafter set forth.

Figure 1:
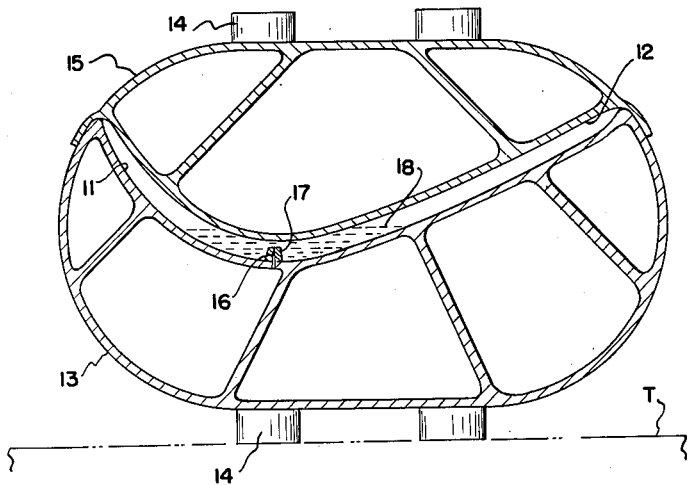
FIG. 1 is a partially schematic elevational section of a pair of mold or die elements for the formation of the fluid impervious container.

Referring to the drawings, there is shown in FIG. 1 one form of molding assembly, which includes the mold cavity 11, which is concave and of a general teardrop shape, when viewed from the top thereof. There is also provided a cooperating mold or die element 12, normally juxtaposed over the mold element 11 and suitably joined thereto for the molding operation hereafter described.

The cavity 11 is mounted over a framework 13, as a support therefor, including the spaced cylindrical leg 14 by which the mold may be mounted upon a suitable support, such as a table, fragmentarily shown at T.

The opposing mold element 12 also includes a framework 15 integrally connected therewith and including also a pair of upwardly extending legs 14 by which the mold element 12 may be supported upon a suitable surface inverted and not in use.

The tapered pin 16 is secured to the cavity element 11 and projects upwardly into the chamber defined between the two cavity elements 11 and 12 to thus complete the molding apparatus for the formation of the fluid impervious envelope, hereafter described.

Figure 3:
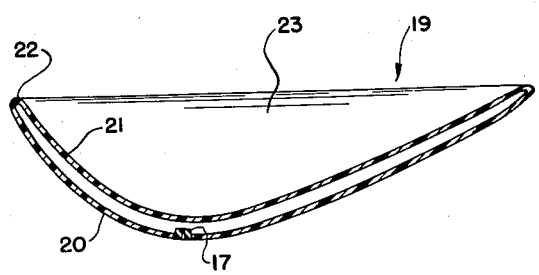
FIG. 3 is a section taken on line 3—3 of FIG. 2.

For the formation of the present envelope, it is seen that the cavity element 11 is concave and that the cavity element 12 is convex for cooperative projection thereinto, of such shape and arrangement as to form the molded article shown in FIG. 3, as hereafter described.

As an initial step in the method of manufacture of the present device, with the single mold element 11—13 resting upon the support T and open at its top, a truncated cone-shaped rubber plug is axially projected over the free end of the upwardly extending pin 16, as indicated at 17, FIG. 1.

In the preferred embodiment of the invention the material making up the plug 17 is known as Hy-Car rubber, being a synthetic rubber produced by the B. F. Goodrich Company. For illustration in the preferred embodiment, the dimensions of the plug are ¼ x ⅜ inch.

As a second step, in the formation of the molded article, the plastic material in liquid form is poured into the mold to occupy a small portion of the opening therein as at 18. In the preferred embodiment of the invention there is employed a polyvinylchloride, which is known in the trade as Plastisol.

The Plastisol normally includes a plasticizer, a stabilizer, silicone and an air or tension release agent and pigmentation. A measured quantity of the Plastisol is inserted into the cavity of the die element 11 in the bottom thereof, as indicated at 18 with the quantity thereof depending upon the size of the molded article and of course the size of the die. Thereafter the top or cover mold element 12 is inverted over and juxtaposed upon the die element 11 to define the cavity therebetween, shown in FIG. 1 and wherein it is seen in the initial step, that the molding material occupies only a small portion of the total volume of said cavity.

The article of manufacture in accordance with the present invention is then molded in a "roto-casting oven" where the present assembled mold device, and a plurality of additional similar molds, from one to five, for illustration, positioned within the "roto-casting oven" and the assembled mold elements suitably secured together for the molding operation are rotated on a horizontal axis and simultaneously on a vertical axis.

The structure and mechanism by which the rotation and support of the mold cavities is achieved does not form a part of the present invention and accordingly a detailed description thereof is omitted.

In the present preferred embodiment of the invention, the temperature on the interior of the oven ranges between 400 and 500 degrees F., and this rotation within the oven or the rotational casting of the molded article takes from ten to twenty minutes, after which the assembled mold is removed from the oven and as a subsequent step is quenched within a body of water at a temperature of approximately 100 to 120 degrees F., which causes the molded article to set and solidify, or otherwise congeal to form the molded article, shown in FIG. 3.

Figure 2:
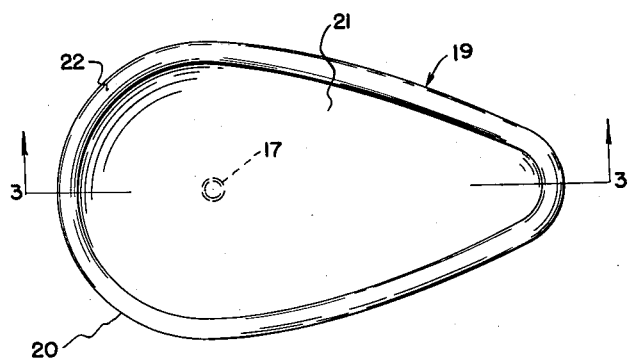
FIG. 2 is a plan view of the molded article.

Here the molded article, generally indicated at 19, FIGS. 2 and 3, is in the nature of a sealed envelope which includes the outer fluid impervious flexible plastic wall 20 of convex shape, and the inner flexible plastic wall 21 of concave shape, including the continuous peripheral rim portion 22 to thus define the completed unit article or fluid impervious envelope which has in its back surface the concave depression 23 and which in plan, as shown in FIG. 2 is of a general teardrop shape.

As a subsequent step in the method of manufacturing the present article, as the same is removed from the mold taking the form generally shown in FIG. 3, there is introduced a quantity of air blowing the product up to a substantially football shape, merely for the purpose of testing the nature and uniformity of the walls, and for testing for leakage and to permit a drying or aging period.

The article as inflated is permitted to stand to dry after which a substantial portion of the air therein is removed using a suitable suction device applied through a hypodermic needle or the like to the plug 17 so that the article re-assumes substantially the form shown in FIG. 3.

As above described for the introduction of the air, a suitable hypodermic type of needle is employed which is projected through the self-sealing plug 17 by which the air is introduced. A similar structure is employed for the pumping out of the air from the interior of the article for the step last mentioned. Plug 17 has a self-sealing aperture 43.

Figure 5:
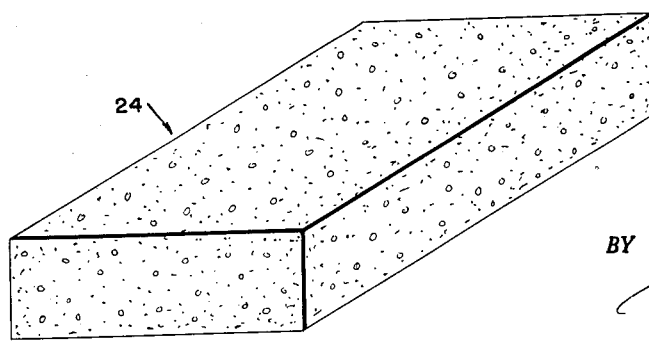
FIG. 5 is a perspective view of a block of resilient foam plastic material from which a second form of backing member is constructed.

Then a backing is applied. This may be a soft layer 44 of foam or flocking concave at 45 adhesively secured to upper sheet 21 as in FIG. 4, or sprayed thereon or otherwise bonded to it. Alternatively it may be a flat surfaced mound shaped mass formed in any suitable manner as for example by being cut from a block 24 of foam, FIG. 5, flat at faces 32 and 33, FIG. 6.

As a next step in the manufacturing process, the plastic molded shell shown in FIG. 3, has applied to its inner concave surface adjacent the rim 22, and extending inwardly for approximately an inch, for illustration, a layer of a suitable adhesive material as indicated at 34, FIG. 6. The corresponding edge portion of the backing 30 has similarly applied thereto as at 35, a corresponding strip of adhesive.

One form of adhesive which may be employed, as illustrative is a methyl ethyl ketone, known in the trade as MEK. Thereafter the inverted foam backing 30 is projected into the cavity 23 of the molded article and pressed peripherally, as indicated in FIG. 6 to assume the position shown and wherein the flat surface 33 is substantially in registry with the outer peripheral edge portion 22 of the molded fluid impervious envelope. After this the molded article is permitted to dry under atmospheric conditions.

In the assembly so far described, as shown in FIG. 6, it is seen that only the outer tapered edge portions of the sides of the insert as at 35 are adhesively secured to corresponding inner edge portions as at 34, FIG. 6 with the remainder of the insert 30 spaced from the concave inner wall 21, as indicated at points 36. This is for the purpose of not unnecessarily stiffening the envelope in its final assembled form, but at the same time providing a backing for the envelope with the fluid therein, as at 37 hereinafter described.

The advantage of this construction is that though a backing is essential in the present device to provide a supporting element for mounting the fluid filled envelope, and for cooperative engagement with the user's body, and for air circulation, nevertheless the backing should not be secured to the rear portions of the envelope throughout its entire surface, as so doing would interfere with the desired lifelike fluidity which is sought to be achieved in the present invention.

As a next step in the manufacturing process, the liquid is inserted into the envelope as at 37 through the plug 17 using a suitable hypodermic needle, which liquid would have the viscosity similar to that of a pancake batter, for illustration. The fluid material 37 may be a self-sealing fluid, such as "Sealex," "Tire Fluid," "Never Leak" or "U.S. Rubber Tire Seal" or a suitable fluid or aqueous solution of cellulose may be employed. Alternately there may be employed a fluid which consists of rubber cement and powdered wood, or aluminum oxide, for illustration, or a mixture of "glycol and cellulose."

Again the self-sealing plug 17, which now forms an integral part of the fluid impervious envelope, is used for the introduction of fluid and automatically closes when the needle is withdrawn so as to prevent the escape of any fluid from the interior of the article of manufacture.

After the fluid has been introduced into the envelope the assembly is again permitted to stand for a period of eight to twenty-four hours to let any air which may be in the fluid come to the surface thereof and thereafter as a subsequent step, again a hypodermic type of needle is introduced through the plug 17 attached to an air exhausting mechanism, or suction pump, by which all of the air is then removed from the assembly, as shown in FIG. 7, leaving only fluid therein, and as is also shown in FIG. 8.

The finished article of manufacture is then projected within a suitable fabric enclosure which may be of nylon, silk or other material, as generally indicated at 38, being so constructed as to avoid protruding seams, and which includes the rear flap 39 transversely cut there-across to define the free end member 40 which underlies a corresponding closure flap 41 by which the present article of manufacture is completely enclosed and ready for use as shown in FIG. 9, within brassiere 42.

Having described my invention, reference should now be had to the following claims.

I claim:

1. A mastectomy prosthesis comprising a hollow flexible concave-convex breast shaped liquid impervious member comprising two thin deeply dished upper and lower nested sheets sealed to each other at their edges and sufficiently similar in dimension and form so that there is a space between them which is deeply dished and is considerably smaller in depth as compared with its length and width;

a liquid filling a substantial part of said space; and
a body engaging backing formed separately from the member and of considerably thicker and softer material and laid and secured upon the upper sheet.

2. The device of claim 1 wherein the space between the sheets of the member is unobstructed throughout its extent to permit free movement of the liquid therein.

3. The device of claim 1 wherein the backing is a finely divided flocking adhesively secured to the upper sheet.

4. The device of claim 1 wherein the backing is a finely divided flocking adhesively secured to the upper sheet and has its upper surface concaved.

5. The device of claim 1 wherein the liquid is a homogeneous mixture of glycol and cellulose.

6. The device of claim 1 wherein the backing is a flat surfaced mound shaped mass of soft material disposed within the upper sheet with its flat surface uppermost and its mound shaped surface contiguous with the upper sheet.

7. The device of claim 6 wherein the mass is a block separately formed and separately laid in the upper sheet and which has only the edge portion of its lower surface adhesively secured to the outer zone of the upper sheet, with the block so dimensioned as to be free of said upper sheet elsewhere, and with an air space between the lower surface of the block and the upper sheet.

8. The device of claim 7 wherein the block has its lower surface flat.

References Cited in the file of this patent

UNITED STATES PATENTS

| | | |
|---|---|---|
| 2,636,182 | Freedman | Apr. 28, 1953 |
| 2,864,373 | Buckley | Dec. 16, 1958 |